United States Patent
Daimoto et al.

(10) Patent No.: US 7,406,420 B2
(45) Date of Patent: Jul. 29, 2008

(54) DATA INPUT METHOD AND DATA INPUT DEVICE FOR INPUTTING TEXT AND VOICE DATA

(75) Inventors: Hiroshi Daimoto, Yawata (JP); Hirohide Ushida, Nagoya (JP); Hiroshi Nakajima, Kyoto (JP); Masahiko Hosono, Kusatsu (JP); Tatsuya Ishikawa, Kawasaki (JP)

(73) Assignee: OMRON Corporation, Kyoto (JP)

( * ) Notice: Subject to any disclaimer, the term of this patent is extended or adjusted under 35 U.S.C. 154(b) by 922 days.

(21) Appl. No.: 10/622,077

(22) Filed: Jul. 17, 2003

(65) Prior Publication Data
US 2004/0054819 A1    Mar. 18, 2004

(30) Foreign Application Priority Data
Jul. 23, 2002    (JP) .............................. 2002-213505

(51) Int. Cl.
*G10L 15/22* (2006.01)
(52) U.S. Cl. .................................................. 704/270.1
(58) Field of Classification Search ................. 704/270, 704/270.1
See application file for complete search history.

(56) References Cited

U.S. PATENT DOCUMENTS

| | | | | |
|---|---|---|---|---|
| 4,931,950 A | * | 6/1990 | Isle et al. ....................... | 706/11 |
| 6,934,552 B2 | * | 8/2005 | Holley et al. ................. | 455/466 |
| 6,996,531 B2 | * | 2/2006 | Korall et al. ................. | 704/270 |
| 7,016,849 B2 | * | 3/2006 | Arnold et al. ................ | 704/275 |
| 7,065,344 B2 | * | 6/2006 | O'Hagan et al. ......... | 455/414.1 |
| 7,107,217 B2 | * | 9/2006 | Watanabe et al. ............ | 704/270 |

FOREIGN PATENT DOCUMENTS

| | | |
|---|---|---|
| CN | 1271226 A | 10/2000 |
| JP | 07-110751 | 4/1995 |
| JP | 7-193548 | 7/1995 |
| JP | 8-95734 | 4/1996 |
| JP | 09-091112 | 4/1997 |
| JP | 09-185439 | 7/1997 |
| JP | 11-288342 | 10/1999 |
| JP | 2000-56797 | 2/2000 |
| JP | 2001-216129 | 8/2001 |
| JP | 3586777 | 8/2004 |

OTHER PUBLICATIONS

Korean Office Action for Korean Application No. 10-2003-0048168 mailed on Jul. 26, 2005 and partial English translation thereof, 3 pages.
Chinese Office Action for Chinese Application No. 031476813 mailed on Jun. 10, 2005 and partial English translation thereof, 7 pages.

* cited by examiner

*Primary Examiner*—Susan McFadden
(74) *Attorney, Agent, or Firm*—Osha • Liang LLP (57) ABSTRACT

A data input device has an input part for inputting data and an output part for outputting a message for prompting a data input operation. The data input device has a text data input part for inputting text data, a voice data input part for inputting voice data, an input item storage part for storing an item to be inputted, and an input control part for selecting one of the text data input part and the voice data input part in accordance with the characteristics of the item to be inputted which is stored in the input item storage part.

3 Claims, 8 Drawing Sheets

| INPUT ITEM | THE NUMBER OF CHARACTERS IN INPUT DATA | MESSAGE |
|---|---|---|
| POSTAL CODE | 7 | PLEASE INPUT YOUR POSTAL CODE |
| ADDRESS | 30 | PLEASE TELL YOUR ADDRESS |
| PHONE NUMBER | 10 | PLEASE INPUT YOUR PHONE NUMBER |
| E-MAIL ADDRESS | 20 | PLEASE TELL YOUR E-MAIL ADDRESS |
| SEX | 2 | PLEASE SELECT YOUR SEX 1) MALE 2) FEMALE |

DATA INPUT METHOD AND DATA INPUT DEVICE FOR INPUTTING TEXT AND VOICE DATA

BACKGROUND OF THE INVENTION

1. Field of the Invention

The present invention relates to a data input method and a data input device, which include text data input means and voice data input means, of selecting optimal input means from the two input means and controlling a data input operation, thereby inputting data.

2. Description of the Related Art

Conventionally, text data input means such as a keyboard, a touch panel, a mouse or a pen has been mainly used as input means of a data input processing device. However, as a voice recognition technique is practically used in recent years, a device having the function of inputting data with voice is being practically used.

The text data input means has an advantage that since data is inputted by a keyboard or the like, there is no misrecognition of the inputted data, but has a disadvantage that since there is no sufficient space in a small-sized device such as a cellular phone and a hierarchical structure is employed at the time of asking a question of prompting a data input operation, the data input operation is troublesome.

On the other hand, the voice data input means has an advantage that the data input operation itself is easy, but has a disadvantage that there is a possibility of misrecognition at the time of recognizing the contents of the inputted data, reliability of the inputted data is lower than that of the text data input means.

As described above, the text data input means and the voice data input means have advantages and disadvantages almost opposite to each other; therefore, it is important to provide optimal input means in accordance with the contents of data to be inputted by a user.

In order to solve the problems, a technique that when a user initially select voice data input means for inputting data, a voice data input mode is automatically set for the subsequent input items is well known as conventional art.

However, the conventional art cannot provide optimal input means to the user by selecting the optimal input means in accordance with the data to be inputted.

SUMMARY OF THE INVENTION

The present invention has been made in view of the above circumstances, and an object thereof is to provide an optimal input method to a user in accordance with data to be inputted by the user when the user inputs the data.

In order to achieve the above object, a data input method according to an aspect of the present invention has at least text data input means and voice data input means, and comprises the steps of: storing information of data to be inputted; and reading out the information of the data to be inputted to select input means used for inputting data in accordance with the read information.

A data input method according to another aspect of the present invention has at least text data input means and voice data input means, and comprises the steps of: storing information of data to be inputted; reading out the information of the data to be inputted to determine an amount or type of inputted data from the read information; and controlling input means on the basis of the determination result.

A data input device according to still another aspect of the present invention has input means for inputting data and output means for outputting a message for prompting a data input operation, and comprises: text data input means for inputting text data; voice data input means for inputting voice data; input item storage means for storing an item to be inputted; and input control means for selecting one of the text data input means and the voice data input means in accordance with the characteristics of the item to be inputted which is stored in the input item storage means.

Further, the input control means may select data input means in accordance with an amount or type of data of the item to be inputted which is stored in the input item storage means.

In addition, the data input device may further comprises: noise measurement means for measuring noise generated around the data input device, and when voice data input means is selected and the noise measured by the noise measurement means is higher than a predetermined value, the input control means may change input means from the voice data input means to the text data input means.

A data input device according to yet another aspect of the present invention has input means for inputting data and output means for outputting a message for prompting a data input operation, and comprises: text data input means for inputting text data; voice data input means for inputting voice data; input control means for selecting the voice data input means as data input means and, when the voice data inputted by the voice data input means is recognized, so that the number of misrecognitions is equal to or more than a predetermined number, changing input means from the voice data input means to the text data input means.

DESCRIPTION OF THE PREFERRED EMBODIMENTS

Hereinafter, description will be given of preferred embodiments of the present invention in detail with reference to the drawings. However, the scope of the present invention is limited to the size, shape or relative arrangement of each constituent element described in the preferred embodiments as long as there is no specific description about the constituent element.

First Embodiment

Figure 1:
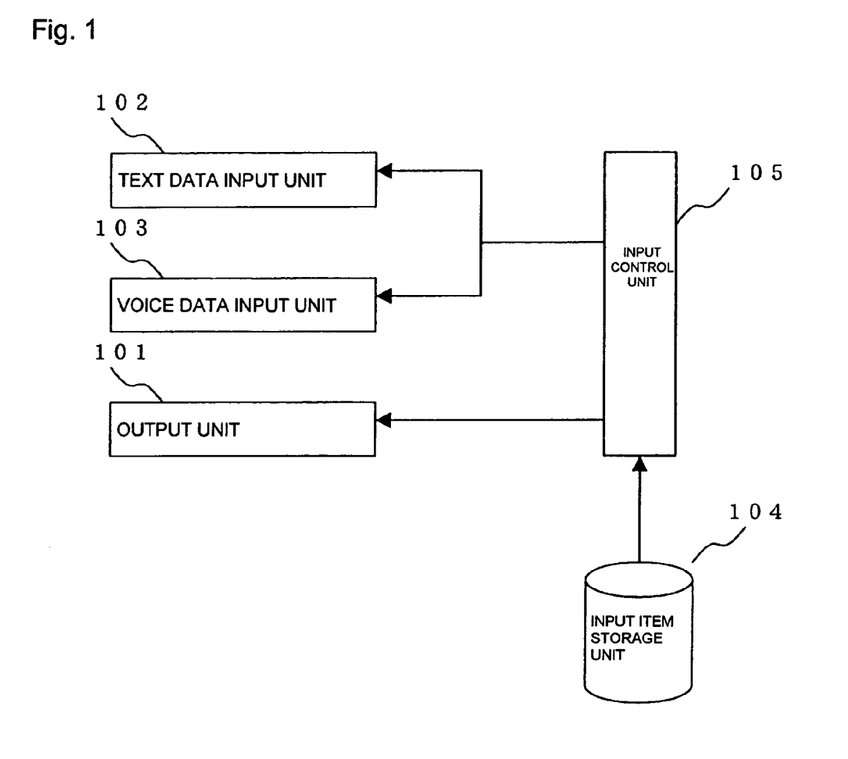
FIG. 1 is a block diagram showing the functions of a data input device according to a first embodiment of the present invention.

FIG. 1 is a block diagram showing the functions of a data input device.

As shown in FIG. 1, the data input device comprises an output unit 101, a text data input unit 102, a voice data input unit 103, an input item storage unit 104 and an input control unit 105.

The input control unit 105 reads out contents of data stored in the input item storage unit 104 and selects an optimal one from the text data input unit 102 and the voice data input unit 103 in accordance with the stored contents.

The output unit 101 is used for checking a message of prompting a data input operation to a user, or the contents of the data inputted by the user. The output unit 101 may be a display device, a voice output device, or a combination thereof.

The text data input unit 102 is used when the user inputs text data. A keyboard, a touch panel, a mouse, a trackball or the like is employed as the text data input unit 102.

The voice data input unit 103 is used when the user inputs voice data by his/her speech. A microphone or the like is employed as the voice data input unit 103.

The input item storage unit 104 stores an item of data to be inputted by the user, and the like.

Figure 2:
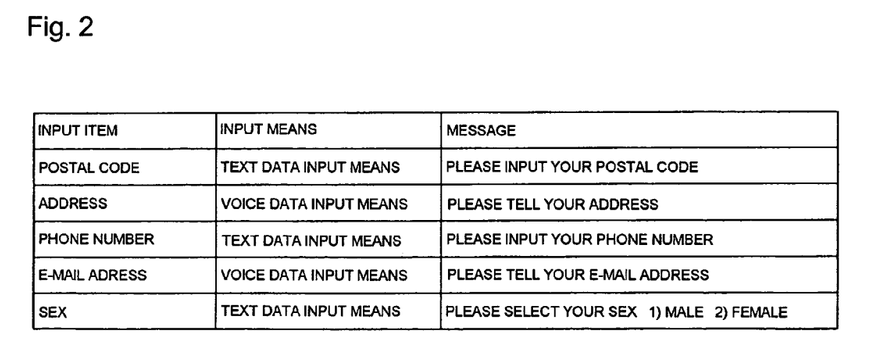
FIG. 2 is a conceptual view showing information stored in an input item storage unit according to the first embodiment.

FIG. 2 is a conceptual view showing information stored in the input item storage unit 104. In this embodiment, an input item, the type of input means used at the time of inputting the item, and a message at the time of prompting the data input operation to the user are stored as information, but the present invention is not limited thereto.

The input control unit 105 controls the output unit 101 so as to output a message at the time of prompting a data input operation in accordance with the data stored in the input item storage unit 104, and selects one of the text data input unit 102 and the voice data input unit 103 in accordance with the input item.

Figure 3:
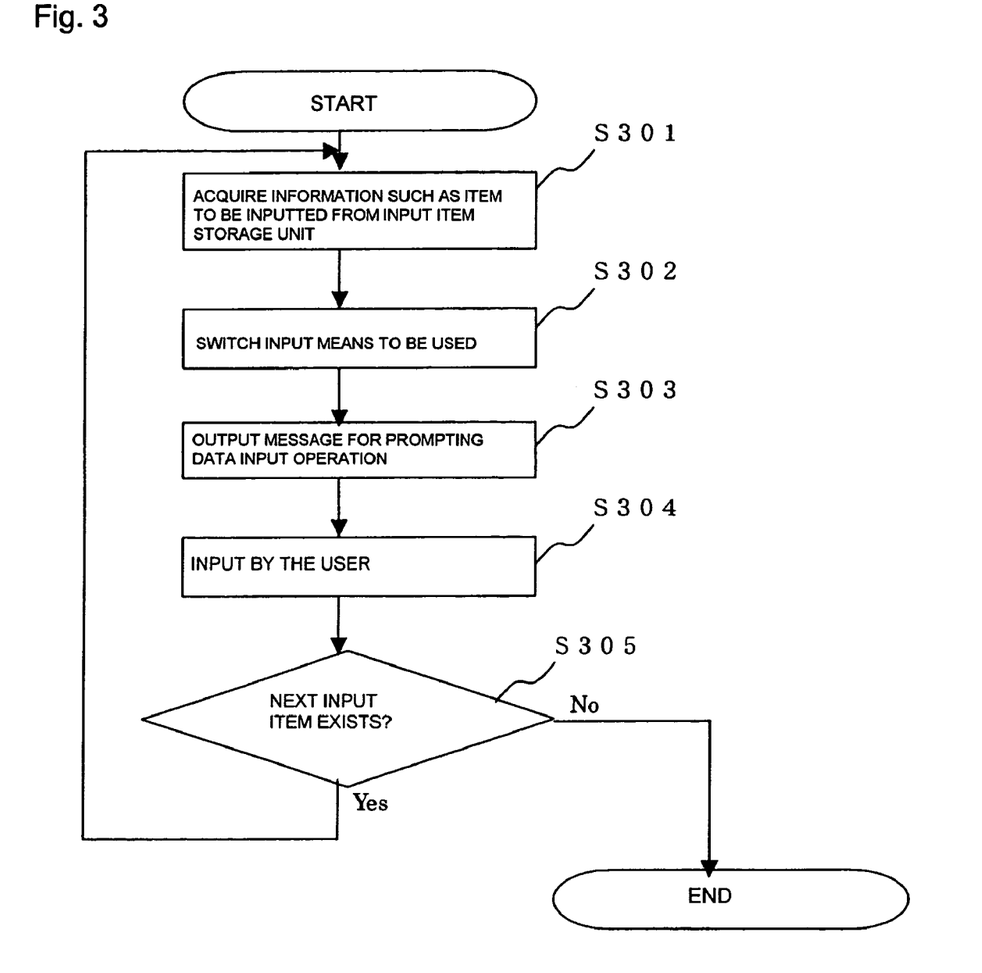
FIG. 3 is a flowchart showing the operation of the data input device shown in FIG. 1.

Description will be give of the operation of the data input device according to this embodiment with reference to FIG. 3.

FIG. 3 is a flowchart showing the operation of the data input device shown in FIG. 1.

First, the input control unit 105 acquires a data item to be inputted subsequently, input means which will be used and a message at the time of prompting a data input operation to the user from the input item storage unit 104 (S301).

Then, the input control unit 105 selects input means used for the data input operation in this time from the text data input means 102 and the voice data input means 103 (S302).

Next, the input control unit 105 sets a message for prompting a data input operation to the user for the output unit 101, and the output unit 101 outputs the message to the user (S303).

Then, the user inputs data (S304), and the data input process is repeatedly executed until the user finishes to input all items (S305).

Thus, it is possible to construct a device capable of providing optimal input means, which can automatically input data, to the user without burdening when the user inputs the data.

Second Embodiment

Next, description will be given of a data input device according to a second embodiment of the present invention with reference to the drawings.

Figure 4:
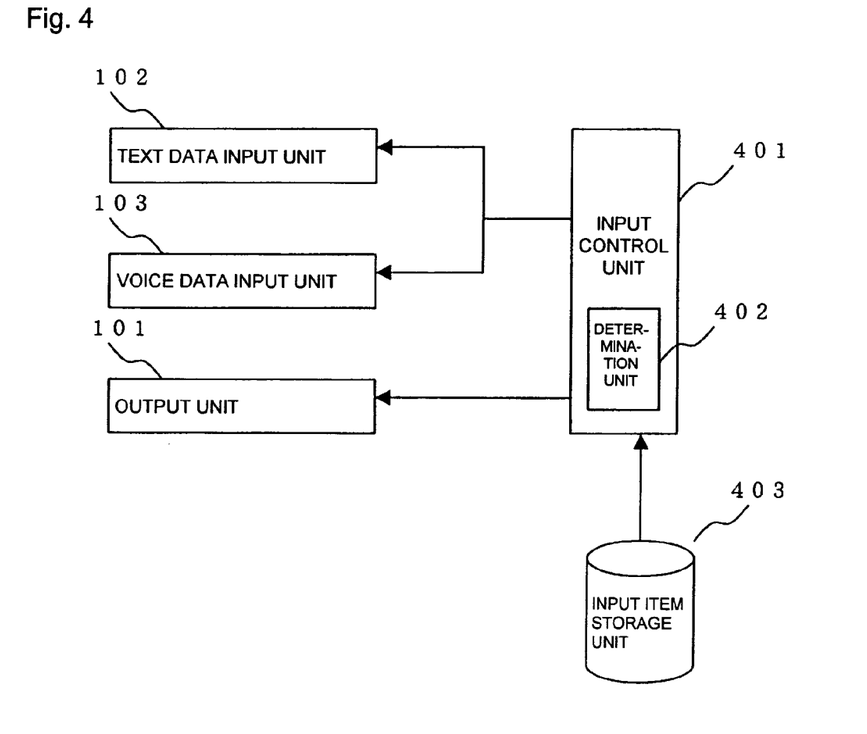
FIG. 4 is a block diagram showing the functions of a data input device according to a second embodiment of the present invention.

FIG. 4 is a block diagram showing the functions of the data input device according to the second embodiment.

The functions shown in FIG. 4 are similar to those in the first embodiment except for an input control unit 401 and an input item storage unit 403.

The input control unit 401 includes, in addition to the functions described in the first embodiment, a determination unit 402 which determines input means to be used for a data input operation by a user on the basis of information stored in the input item storage unit 403.

The input item storage unit 403 stores items of data to be inputted by the user, and the like.

Figure 5:
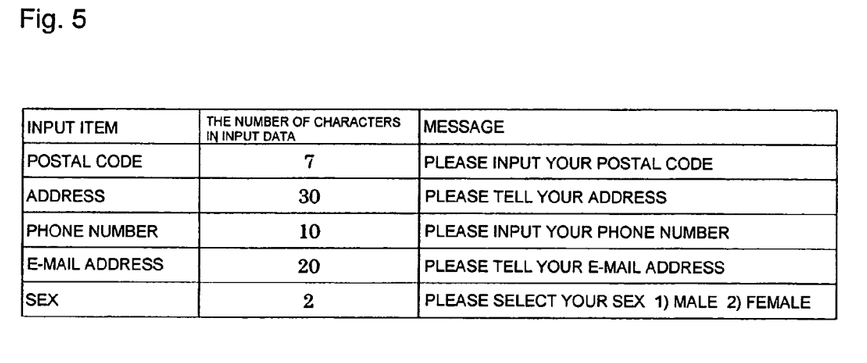
FIG. 5 is a conceptual view showing information stored in an input item storage unit according to the second embodiment.

FIG. 5 is a conceptual view showing information stored in the input item storage unit 403. In this embodiment, an input item, the number of characters in input data, and a message at the time of prompting a data input operation to the user are stored as the stored information, but the present invention is not limited thereto. It is also considered that the attribute or type of input data may be employed in place of the number of characters in input data.

The input control unit 401 reads out contents of data stored in the input item storage unit 403, determines optimal input means in the determination unit 402 in accordance with the stored information, and selects one of text data input unit 102 and the voice data input unit 103 on the basis of the determination result.

Figure 6:
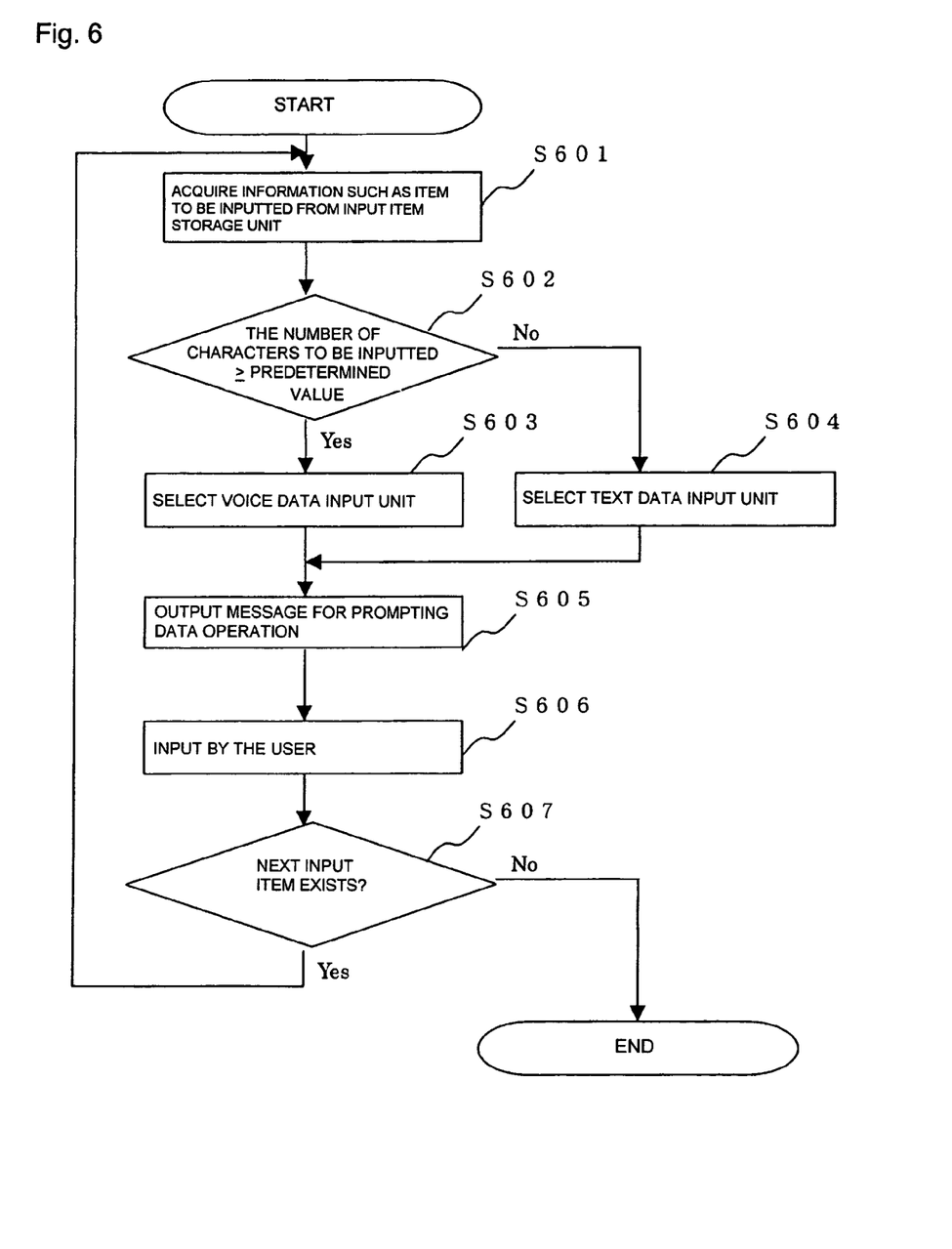
FIG. 6 is a flowchart showing the operation of the data input device shown in FIG. 4.

FIG. 6 is a flowchart showing the operation of the data input device according to the second embodiment shown in FIG. 4.

Description will be given of the operation of the data input device according to the second embodiment with reference to FIG. 6.

First, the input control unit 401 acquires the contents of an item of data to be inputted subsequently, the number of characters in data to be inputted and a message at the time of prompting a data input operation to the user, from the data item storage unit 403 (S601).

Then, when the determination unit 402 determines that the number of characters to be inputted in this time is equal to or more than a predetermined value (Yes in S602), the input control unit 401 selects the voice data input unit 103 as input means used for inputting the item in this time from the text data input unit 102 and the voice data input unit 103 (S603).

When the determination unit 402 determines that the number of characters to be inputted in this time does not reach the predetermined value (No in S602), the input control unit 401 selects the text data input unit 102 as input means used for inputting the item in this time from the text data input unit 102 and the voice data input unit 103 (S604).

Next, the input control unit 401 sets a message for prompting a data input operation to the user for the output unit 101, and the output unit 101 outputs the message to the user (S605).

Then, the user inputs data (S606), and the data input process is repeatedly executed until the user finishes to input all items (S607).

Thus, it is possible to construct a device capable of providing optimal input means, which can automatically input data, to the user without burdening without concretely specifying input means utilized by the user for the data input device in advance when the user inputs data.

Third Embodiment

Next, description will be given of a data input device according to a third embodiment of the present invention with reference to the drawings.

Figure 7:
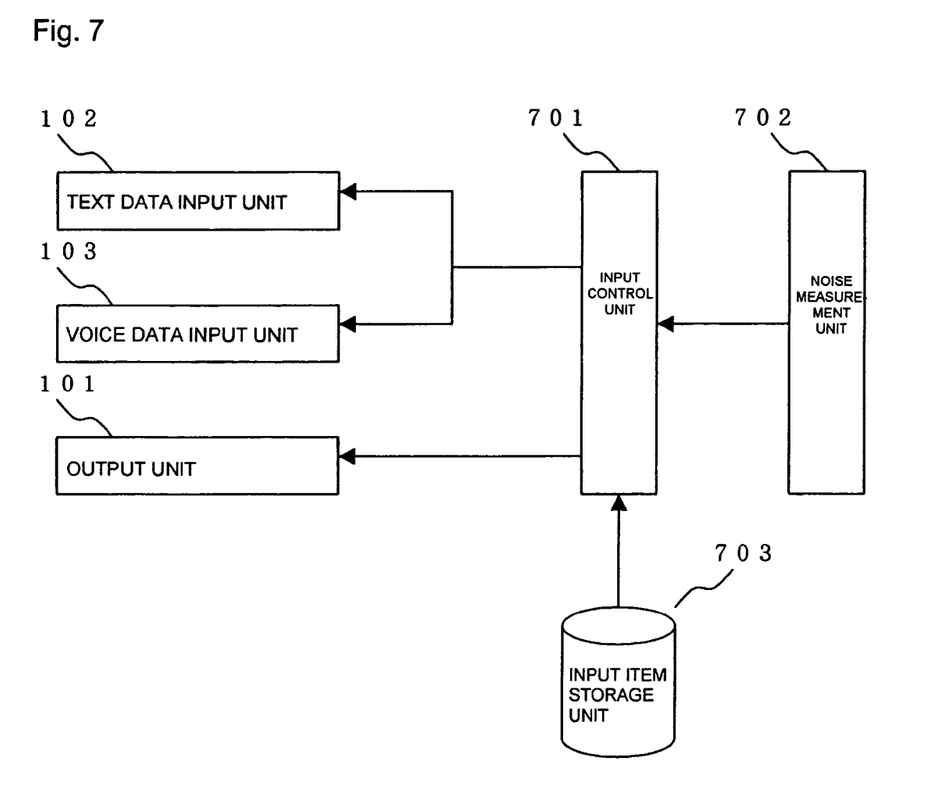
FIG. 7 is a block diagram showing the functions of a data input device according to a third embodiment of the present invention.

FIG. 7 is a block diagram showing the functions of the data input device according to the third embodiment.

As shown in FIG. 7, the data input device according to this embodiment comprises a noise measurement unit 702 in addition to the functions shown in FIG. 1.

The functions shown in FIG. 7 are similar to those in the first embodiment except for an input control unit 701 and an input item storage unit 703.

The noise measurement unit 702 measures noise generated around the data input device, and compares the noise with a preset noise upper limit value.

In addition to the function described in the first embodiment, when the voice data input unit 103 is selected, the input control unit 701 changes input means from the voice data input unit 103 to the text data input unit 102 in accordance with the comparison result of the ambient noise measured by the noise determination unit 702 with the preset noise upper limit value.

That is, the input control unit 701 reads out contents of data stored in the input item storage unit 703, allows the noise determination unit 702 to measure the ambient noise when the voice data input unit 103 is selected as input means on the basis of the stored contents, and changes input means to the text data input unit 102 when the noise is higher than the predetermined value.

In this embodiment, the input item storage unit 703 is described on the basis of the first embodiment, but may be described on the basis of the second embodiment. If the input item storage unit 703 is described on the basis of the second embodiment, it can be realized by adding the functions described in the second embodiment as the input control unit 701.

Figure 8:
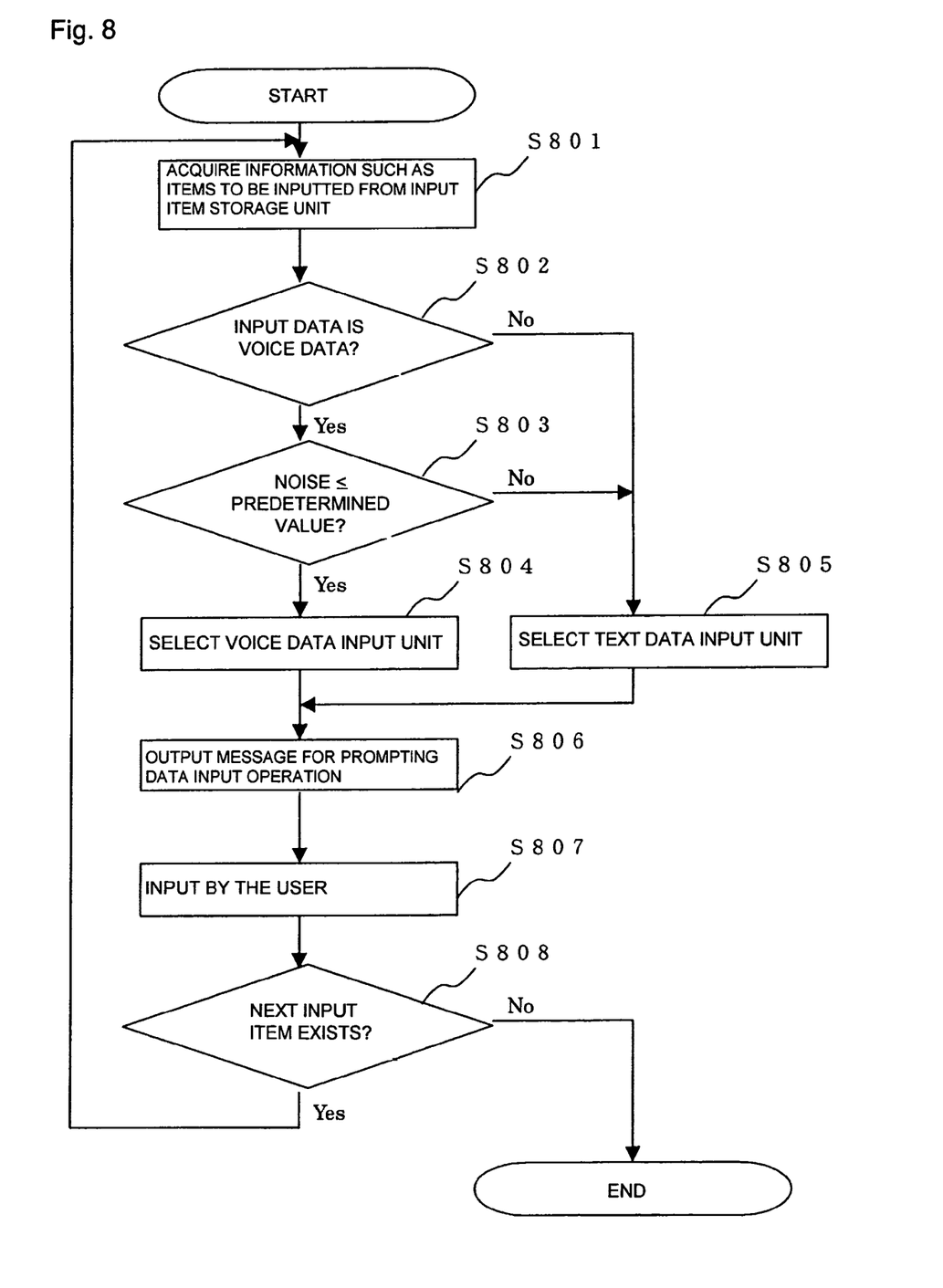
FIG. 8 is a flowchart showing the operation of the data input device shown in FIG. 7.

FIG. 8 is a flowchart showing the operation of the data input device according to the third embodiment shown in FIG. 7.

Description will be given of the operation of the data input device according to the third embodiment with reference to FIG. 8.

First, the input control unit 701 acquires an item of data to be inputted subsequently, input means which will be used and a message at the time of prompting a data input operation to the user from the input item storage unit 703 (S801).

When the voice data input unit 103 is designated as data input means (Yes in S802) and when the noise measurement unit 702 measures that the ambient noise is equal to or less than a predetermined value (Yes in S803), the input control unit 701 selects the voice data input unit 103 as input means used for inputting the item in this time from the text data input unit 102 and the voice data input unit 103 (S804).

When the noise measurement unit 702 measures that the ambient noise exceeds the predetermined value (No in S803), the input control unit 701 selects the text data input unit 102 as input means used for inputting the item in this time from the text data input unit 102 and the voice data input unit 103 (S805).

When the text data input unit 102 is designated as data input means (No in S802), the input control unit 701 selects the text data input unit 102 as input means used for inputting the item in this time from the text data input unit 102 and the voice data input unit 103 (S805).

Next, the input control unit 701 sets a message for prompting a data input operation to the user for the output unit 101, and the output unit 101 outputs the message to the user (S806).

Then, the user inputs data (S807), and the data input process is repeatedly executed until the user finishes to input all items (S808).

As described above, it is possible to construct a device capable of predicting reliability at the time of inputting data with voice by taking the ambient noise into consideration and capable of providing optimal data input for the user by changing input means to the text data input means if necessary.

Fourth Embodiment

Next, description will be given of a data input device according to a fourth embodiment of the present invention with reference to the drawings.

Figure 9:
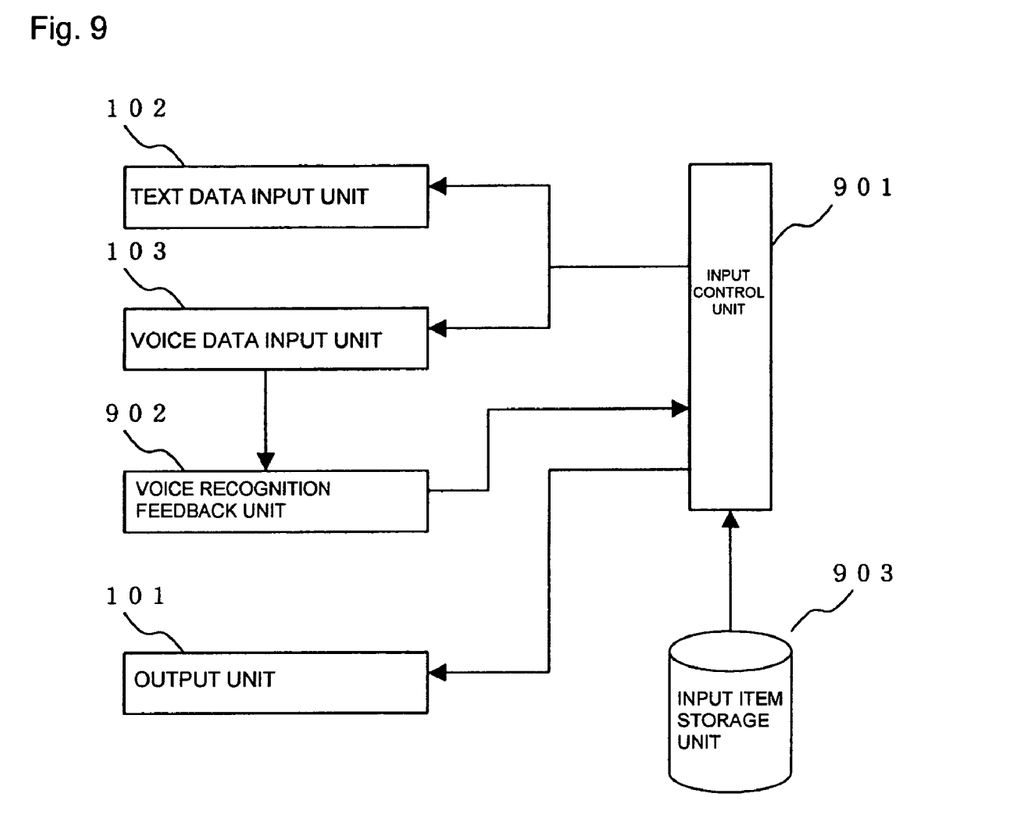
FIG. 9 is a block diagram showing the functions of a data input device according to a fourth embodiment of the present invention.

FIG. 9 is a block diagram showing the functions of the data input device according to the fourth embodiment.

As shown in FIG. 9, the data input device according to this embodiment comprises a voice recognition feedback unit 902 in addition to the functions shown in FIG. 1.

The functions shown in FIG. 9 are similar to those in the first embodiment except for an input control unit 901 and an input item storage unit 903.

The voice recognition feedback unit 902 recognizes voice data inputted in the voice data input unit 103, and compares the number of misrecognitions based on the recognition result with the preset upper limit of the number of misrecognitions.

In addition to the function described in the first embodiment, when data is inputted by the voice data input unit 103, so that the number of misrecognitions exceeds the upper limit as a comparison result by the voice recognition feedback unit 902, the input control unit 901 changes input means from the voice data input unit 103 to the text data input unit 102.

In this embodiment, the input item storage unit 903 is described on the basis of the first embodiment, but may be described on the basis of the second embodiment. If the input item storage unit 903 is described on the basis of the second embodiment, it can be realized by adding the functions described in the second embodiment as the input control unit 901.

Figure 10:
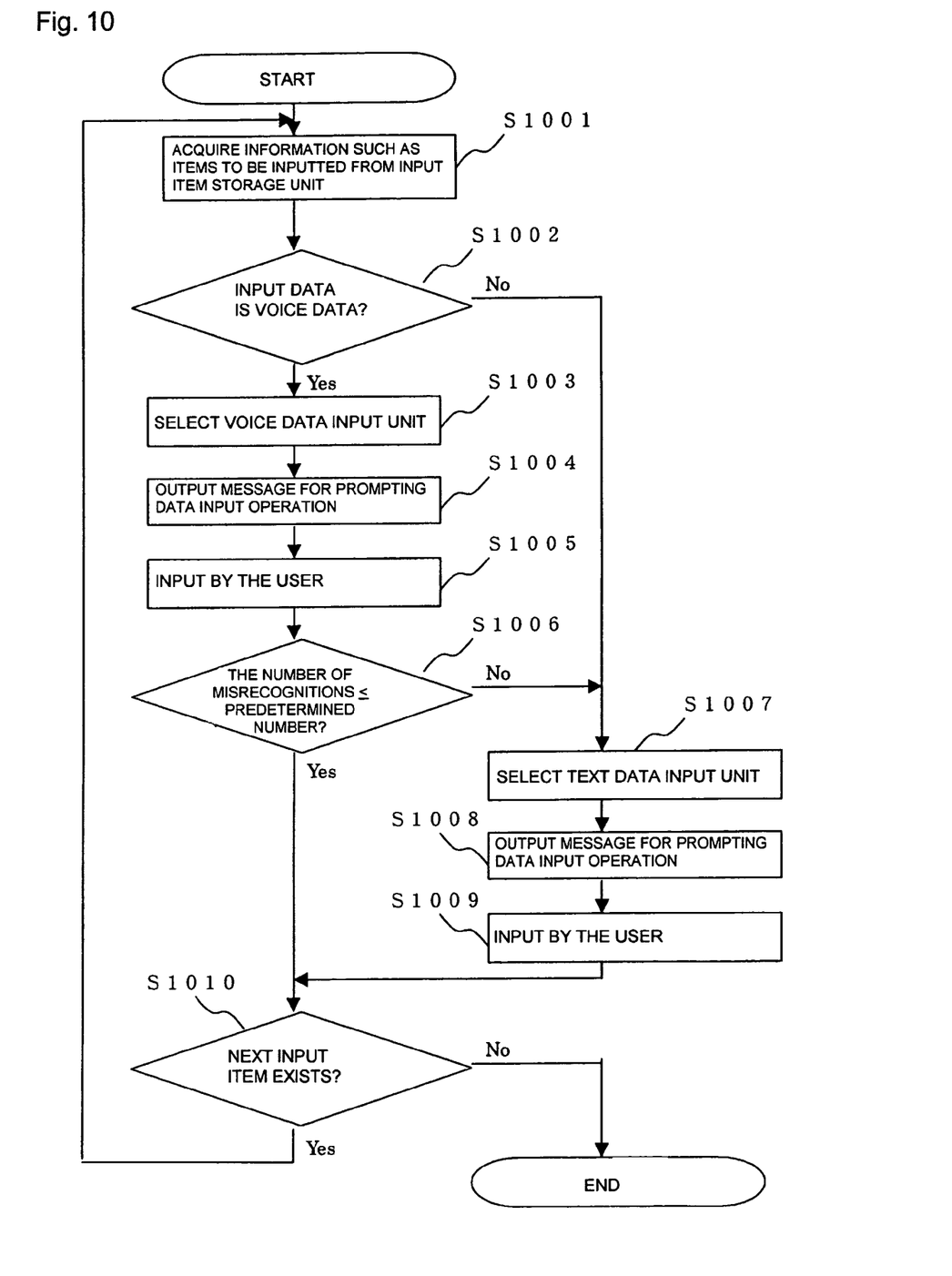
FIG. 10 is a flowchart showing the operation of the data input device shown in FIG. 9.

FIG. 10 is a flowchart showing the operation of the data input device according to the fourth embodiment shown in FIG. 9.

Description will be given of the operation of the data input device according to the fourth embodiment with reference to FIG. 10.

First, the input control unit 901 acquires an item of data to be inputted subsequently, input means which will be used and a message at the time of prompting a data input operation to the user from the input item storage unit 903 (S1001).

When the voice data input unit 103 is designated as data input means (Yes in S1002), the input control unit 901 selects the voice data input unit 103 as the data input means (S1003).

Next, the input control unit 901 sets a message for prompting a data input operation to the user for the output unit 101, and the output unit 101 outputs the message to the user (S1004).

Then, the user inputs data (S1005). The voice recognition feedback unit 902 recognizes and processes the inputted voice data and compares the number of misrecognitions with a preset upper limit value. When the number of misrecognitions is equal to or less than the upper limit value (Yes in S1006), the process proceeds to the next input process (S1010).

When the number of misrecognitions exceeds the upper limit value (No in S1006), the input control unit 901 changes data input means from the voice data input unit 103 to the text data input unit 102 (S1007), and sends a message that the contents of the item have to be inputted by the text data input unit 102 again to the user through the output unit 101 (S1008).

After the user inputs data again (S1009), the data input process is repeatedly executed until the user finishes to input all items (S1010).

When the text data input unit 102 is designated as data input means (No in S1002), the input control unit 901 changes the data input means to the text data input unit 102 (S1007).

As described above, it is possible to construct a device capable of providing optimal data input for a user by taking a voice recognition result at the time of inputting data with voice by the user into consideration and by selecting text data input means if necessary.

Thus, it is possible to construct a device capable of providing optimal input means, which can automatically input data, to the user without burdening when the user inputs the data.

What is claimed is:

1. A data input device having input means for inputting data and output means for outputting a message for prompting a data input operation, comprising:

text data input means for inputting text data;

voice data input means for inputting voice data;

input item storage means for storing an item to be inputted, which is associated with an output message prompt and characteristics of the item, wherein the characteristics of the item include at least one of an amount of an input characters and a type of the data input means applied for inputting the data; and input control means for selecting one of the text data input means and the voice data input means in accordance with the characteristics of the item to be inputted; and output means for outputting the message prompt so as to prompt a user to input data using the one of the text data input means and the voice data input means, which is selected by the input control means.

2. The data input device according to claim 1, wherein the input control means selects data input means in accordance with an amount or type of data of the item to be inputted which is stored in the input item storage means.

3. The data input device according to claim 1, further comprising:

noise measurement means for measuring noise generated around the data input device, wherein when voice data input means is selected and the noise measured by the noise measurement means is higher than a predetermined value, the input control means changes input means from the voice data input means to the text data input means.

* * * * *